United States Patent [19]

McLean et al.

[11] Patent Number: 5,498,470

[45] Date of Patent: Mar. 12, 1996

[54] PRINTING BLANKET HAVING IMPROVED DYNAMIC THICKNESS STABILITY AND METHOD OF MAKING

[75] Inventors: Michael E. McLean, Waynesville; Melvin D. Pinkston, Hendersonville; Noel D. Arrington, Waynesville, all of N.C.; Dennis R. Wolters, Dayton, Ohio; Allen T. Shannon, Lake Junaluska; Thomas G. Ferguson, Waynesville, both of N.C.; Graham Macfarlane, Reutlingen; Chris Baldermann, Hohenstein, both of Germany; John Dolan, Tayside, Scotland

[73] Assignee: Day International, Inc., Dayton, Ohio

[21] Appl. No.: 919,175

[22] Filed: Jul. 23, 1992

[51] Int. Cl.⁶ .................................................. B32B 7/00
[52] U.S. Cl. .......................... 428/246; 428/250; 428/272; 428/909; 427/389.9
[58] Field of Search ........................ 428/258, 272, 428/909, 246, 250; 427/389.9

[56] References Cited

U.S. PATENT DOCUMENTS

| | | | |
|---|---|---|---|
| 3,186,894 | 6/1965 | Liles et al. | 161/84 |
| 3,428,517 | 2/1969 | Grupe et al. | 161/165 |
| 3,652,376 | 3/1972 | Bowden, III | 428/249 |
| 3,983,287 | 9/1976 | Goosen et al. | 428/241 |
| 4,048,368 | 9/1977 | Hale et al. | 428/235 |
| 4,174,244 | 11/1979 | Thomas et al. | 156/242 |
| 4,425,398 | 1/1984 | Berczi | 428/253 |
| 4,471,011 | 9/1984 | Spöring | 428/68 |
| 4,981,750 | 1/1991 | Murphy et al. | 428/220 |
| 5,066,537 | 11/1991 | O'Rell et al. | 428/246 |
| 5,069,958 | 12/1991 | Burns, Jr. | 428/246 |
| 5,116,669 | 5/1992 | Sonobe | 428/250 |

FOREIGN PATENT DOCUMENTS

| | | |
|---|---|---|
| 041849 | 12/1981 | European Pat. Off. . |
| 472942 | 3/1992 | European Pat. Off. . |
| 62-124993 | 6/1987 | Japan .................... B41N 9/02 |
| 1567892 | 5/1980 | United Kingdom . |
| 83/02909 | 9/1983 | WIPO . |

*Primary Examiner*—Christopher W. Raimund
*Attorney, Agent, or Firm*—Killworth, Gottman, Hagan & Schaeff

[57] ABSTRACT

A printing blanket which resists gauge loss throughout its useful life when subjected to printing nip pressures by retaining at least 95% of its original gauge throughout the useful life of the printing blanket. The printing blanket includes at least a printing surface layer and at least one reinforcing woven fabric ply and may also include a compressible layer. At least one, and preferably all, of the reinforcing woven fabric plies in the blanket construction are treated or fabricated to resist permanent deformation when subjected to printing nip pressures.

11 Claims, 1 Drawing Sheet

PRINTING BLANKET HAVING IMPROVED DYNAMIC THICKNESS STABILITY AND METHOD OF MAKING

BACKGROUND OF THE INVENTION

This invention relates to a printing blanket, and more particularly to a printing blanket having an improved dynamic thickness stability and resistance to permanent gauge loss.

In offset lithography, a rotary cylinder is covered with a printing plate which normally has a positive image area receptive to oil-based inks and repellent to water and a background area where the opposite is true. The printing plate is rotated so that its surface contacts a second cylinder covered with a rubber-surfaced ink-receptive printing blanket (sometimes also called a printer's blanket). The ink present on the image surface of the printing plate transfers, or offsets, to the surface of the blanket. Paper or other sheet stock to be printed is then passed between the blanket-covered cylinder and a rigid back-up cylinder to transfer the image from the surface of the blanket to the paper.

During the step in which the inked image is transferred from the plate to the blanket and the step where the image is transferred from the printing blanket to the paper, it is important to have intimate contact between the two contacting surfaces. An exact amount of interference pressure is required so that the blanket contacts and removes ink from the image plate and transfers the inked image to a proper depth into the paper. This is ordinarily achieved by positioning the blanket-covered cylinder and the supporting cylinder it contacts so that there is a fixed interference between the two and so that the blanket is compressed throughout the run to a fixed depth, typically approximately 0.05 to 0.10 mm (0.002 to 0.004 inches). It is important that this compression be maintained uniformly over the entire surface of the blanket.

Within the current state of the art, all printing blankets lose thickness (i.e., lose gauge or "sink") when they are initially tensioned and installed, and further lose thickness as the blanket is repeatedly exposed to the interference pressures at the nips between the printing cylinder and blanket-covered cylinder and the blanket-covered cylinder and rigid back-up cylinder, respectively. Blankets can fail catastrophically due to blanket smash, a permanent deformation in a portion of the entire blanket surface, or from a gradual deterioration of blanket gauge over time due to the repeated cycling of the interference pressures on the blanket's surface. When the thickness of a blanket recedes beyond the limits of press adjustment, the print pressure becomes insufficient to cause transfer of the inked image from the print cylinder to the blanket or the blanket to the paper, or both. Thus, for a typical blanket, a permanent loss of thickness of as little as 0.05 to 0.10 mm (0.002 to 0.004 inches) may require a press stoppage.

Conventionally, the fixed interference described above is accomplished by inserting one or more thin layers of paper or the like between the blanket and the surface of the blanket cylinder to build up the thickness of the blanket. This process is known as packing a blanket. Once the gauge loss of the blanket reaches a certain amount, as described above, additional thickness must be supplied under the blanket. This involves stopping the press, demounting the blanket and original packing, repacking, and then remounting and retensioning the blanket.

The packing process presents problems however in that the procedure is time consuming, resulting in down time for the printing equipment. Typically, press downtime can cost from several hundred to over a thousand dollars per hour. It may take over 30 minutes to pack or repack a blanket. Further time is lost as the system is retuned to optimum settings. Additionally, once positioned on the cylinder, the packing paper tends to slide, slip, and/or fold which may render the blanket surface nonuniform and result in poor printing results.

To avoid some of the problems associated with packed blankets, some press operators, and in particular news press operators, have used blankets which do not require packing. So-called "no pack" blankets have been developed to provide a fixed interference without the need to pack the blanket. No pack blankets are manufactured to very precise gauges so that they can be installed directly onto a blanket cylinder with the correct amount of interference. These blankets have the advantage of a one-piece construction which requires no positioning of packing paper beneath the blanket. This results in less down time for the printing equipment when an old blanket is removed and replaced with a new blanket.

Such no pack blankets, like most printing blankets, are normally composed of a base material which gives the blanket dimensional stability. Woven fabrics are preferred. The base may consist of one or more layers of such fabric. The working surface of the blanket which contacts the ink is typically an elastomeric layer of natural or synthetic rubber which is applied over the base layer or layers. The base layer or layers and working surface are laminated together using suitable adhesives. Again, such blankets exhibit some gauge loss upon initial tensioning and installation and continue to lose thickness over time during use. However, once the gauge (thickness) loss on a no pack blanket exceeds the limits of press adjustment, the blanket becomes unusable without recourse and must be replaced by a new blanket.

Accordingly, there remains a need in the art for a printing blanket which resists gauge loss throughout its useful life. Such a blanket would reduce expensive down time for press operators and require fewer adjustments of the press during operation.

SUMMARY OF THE INVENTION

The present invention meets that need by providing a printing blanket which resists gauge loss throughout its useful life when subjected to printing nip pressures. In accordance with one aspect of the invention, a printing blanket is provided which includes at least a printing surface layer and at least one reinforcing woven fabric ply. The blanket may also include a compressible layer as is known in the art. Typically, a printing blanket will include more than one reinforcing fabric ply. To enjoy the benefits of the present invention, at least one, and preferably all of the reinforcing woven fabric plies in the blanket construction will include means for resisting permanent deformation when subjected to printing nip pressures. By resisting permanent deformation, we mean that the blanket should retain at least 95% of its original gauge throughout the useful life of the blanket. Typically, such a useful life may involve over one million impressions.

The present invention includes the use of fabrics containing both synthetic and natural fibers, as well as blends thereof. Typical fabric compositions include cotton, rayon, polyester, Kevlar (trademark of E. I. du Pont de Nemours for polyaramid fiber), and Tencel (trademark of Courtaulds Fibers Inc.). Such fabrics typically are made from yarns or threads having a number of individual fibers twisted into a fiber bundle.

The means for enabling the woven ply or plies to resist permanent deformation can take a number of forms in accordance with the present invention. In one embodiment, the means for resisting permanent deformation comprise from about 6 to about 125 gm/m$^2$, and preferably from about 10 to about 25 gm/m$^2$, of an elastomeric compound impregnated in the woven fabric ply. By impregnated, we mean that the elastomer is forced into individual threads of the fabric and the excess elastomer removed, leaving elastomer only within the individual yarn threads. Impregnation is to be differentiated from merely coating the surfaces of the fabric. The elastomeric compound is selected from the group consisting of natural and synthetic rubbers, latexes, and thermoplastic polymeric resins. Preferred elastomers include carboxylated nitrile rubber and acrylonitrile butadiene rubber.

To accomplish impregnation of the woven fabric ply, the ply may be dipped into a solution of either a liquid rubber compound or an aqueous-based latex rubber, the solution forced or squeezed into the ply, and the excess solution removed. The liquid rubber dipping solution may be formed by dissolving a solid elastomer into a solvent. An example of a liquid rubber in solvent suitable for use in the present invention is acrylonitrile butadiene rubber in toluene or methylethyl ketone. Alternatively, the elastomer compound may be a water-based latex into which the woven fabric ply may be dipped.

In either instance, it is preferred that the woven fabric ply be maintained under tension during the dipping process. Preferably tension of from about 2.8 to about 16.8 kg/cm of fabric width is maintained. The ply is then dried to evaporate solvent or water, as the case may be, and solidify the impregnated elastomer.

In another embodiment of the invention, the printing blanket of the present invention may be made to resist permanent deformation by calendaring the woven fabric ply with heated rolls to permanently reduce its thickness after impregnation with from about 2 to 7 gm/m$^2$ of liquid elastomer but prior to its assembly in the blanket. A preferred method for reducing the initial gauge of the woven fabric ply is after impregnation with from about 2 to 7 gm/m$^2$ of liquid elastomer, to pass the fabric ply between rotating rolls which have been heated, preferably to a temperature above the boiling point of water but below that which will scorch the fabric and which have been adjusted to apply pressure to the fabric. Typical roll temperatures are in the range of from about 150° to 350° F. and typical pressures applied are from about 2 to 10 bars. The gauge of the ply is reduced, preferably to about 65–75% of its initial thickness by the calendaring step.

Alternatively, the step of impregnating the woven fabric ply may include heating the elastomeric compound until it is pliable and then forcing the heated elastomeric compound under pressure into the interstices between warp and weft yarns of the woven fabric ply. This may be accomplished by spreading the pliable elastomer onto one of two rotating rolls and passing the fabric ply between them. By operating the rolls at different speeds, the resulting friction scrubs the pliable elastomer into the interstices of the weave and partially into the surface of individual fiber bundles.

In another embodiment of the invention, the means for resisting permanent deformation comprises using a weave for the woven fabric ply which minimizes air gaps between yarn fibers and produces a dense weave. This may be accomplished by using large diameter single yarn fibers, by using a plurality of smaller diameter yarn fibers in the warp direction and a single yarn fiber in the weft direction of the weave which crosses over groups of warp yarns, by using a plurality of yarns in both the warp and weft directions which cross over groups of yarns, or by using a yarn of a helical wrap around a single smaller diameter core yarn.

Accordingly it is a feature of the present invention to provide a printing blanket which resists gauge loss throughout its useful life when subjected to printing nip pressures. This, and other features and advantages of the present invention will become apparent from the following detailed description, the accompanying drawings, and the appended claims.

DETAILED DESCRIPTION OF THE PREFERRED EMBODIMENTS

Figure 1:
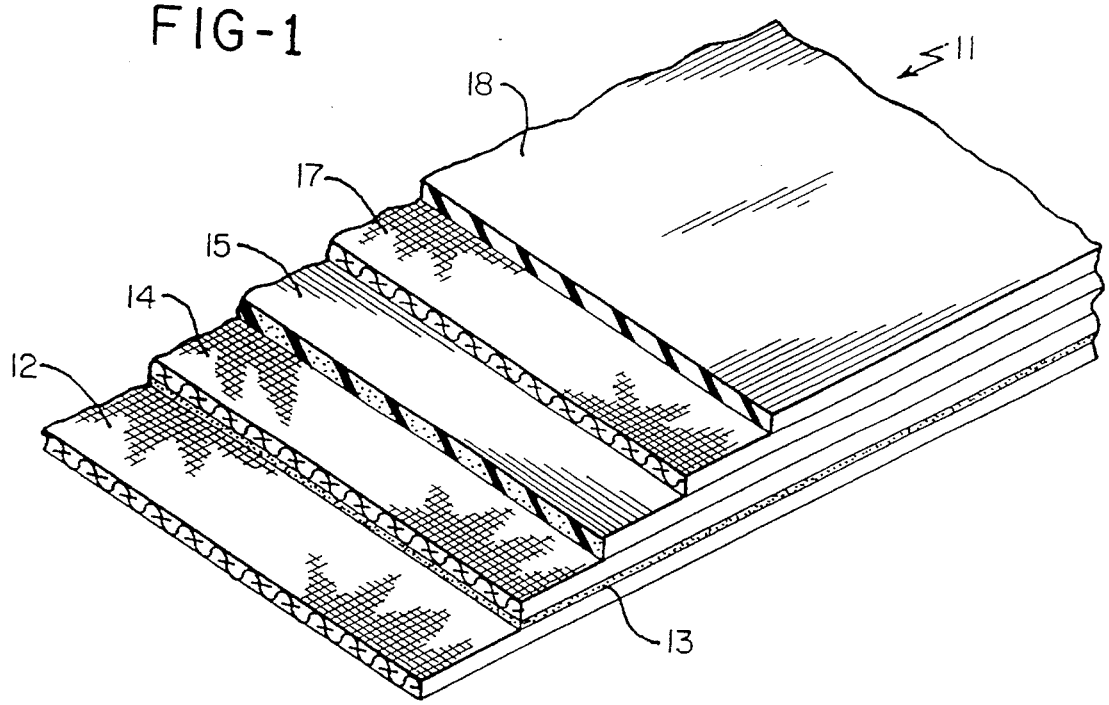
FIG. 1 is a perspective view of a segment of a printing blanket illustrating the various plies which make up the blanket.

A typical printing blanket utilizes a plurality of layers of reinforcing fabric which are laminated together with an elastomeric adhesive and over which is positioned a thin layer of an elastomeric face rubber which acts as the ink carrying and transferring layer. Optionally, such blankets may also contain a thin layer of a microporous elastomeric material which is compressible when subjected to printing nip pressures, but recovers to its original thickness when the pressure is released.

As illustrated in FIG. 1, a typical printing blanket 11 comprises a base ply 12 of woven fabric. As is conventional in the art, an additional ply or plies of reinforcing fabric such as plies 14 and 17 are also included in the laminate construction. Typically, the fabric plies are low stretch fabrics such as certain types of cotton, rayon, polyester, or glass. In the normal manufacturing process, the plies are formed of a long band of fabric. Plies 12 and 14 may be bonded together by an adhesive layer 13 which may be a neoprene rubber cement or other suitable adhesive material. The blanket may optionally contain a layer of a microporous, compressible elastomeric material 15, located under surface layer 18, between any succeeding layers of reinforcing fabric, or may be included in a reinforcement layer or between the print face surface layer and a fabric reinforcing layer.

Surface layer 18, which is adapted to accept an inked image from a printing plate, is typically formed from any suitable polymeric material including both natural rubbers and synthetic resins. For example, some rubber compounds that have been used for forming printing blanket surface layers include acrylonitrile butadiene rubber, isobutylene isoprene elastomer, polysulfide rubber, ethylene propylene-diene terpolymer, natural rubber, styrene butadiene rubber, and a blend of acrylonitrile-butadiene and polysulfide rubber. The surface can be talc coated-smooth molded, ground after vulcanization, or textured by any known process such as that disclosed in U.S. Pat. No. 4,751,127, assigned to the assignee of the present invention.

Surface layer 18 may be formed in a conventional manner by mixing an unvulcanized rubber compound in a suitable solvent and subsequently knife coating the solution onto a fabric carcass such as fabric layer 17. Typically, the application is made in a plurality of thin coats. After each coat is applied, the solvent is allowed to evaporate so that the resultant rubber layer is substantially solvent free.

Printing blanket 11 is then heated for a suitable period of time to vulcanize or cure the unvulcanized rubber in the construction. Blanket 11 may be formed initially in a long roll or the like from which individual blankets may be cut to size.

We have determined that within this type of blanket construction, the layer or layers which are most likely to be permanently deformed by the printing process are the reinforcing fabric layers. Permanent deformation, in which a permanent loss of gauge occurs, is to be distinguished from the temporary deformation which all printing blankets undergo when subjected to printing nip pressures. Fabric used in printing blankets is typically comprised of warp thread yarns which are interwoven in an alternating over-under pattern with weft yarns at an approximately 90° angle. Both the warp and weft yarn threads are comprised of numerous individual fibers twisted into a loose fiber bundle with up to 50% air space in each yarn bundle.

When subjected to repeated cyclic printing pressures (typically from several hundred thousand to over one million cycles), the individual yarn threads move, compressing to fill in the air space in each bundle. The air originally present in the fiber bundles eventually leaves the blanket construction. Thus, over time each bundle of fibers deforms and flattens or becomes smaller in cross section. The net result over the entire fabric is a loss in gauge (thickness) of the fabric which over time exceeds the ability of the press operator to adjust. For a packed blanket, such a loss in gauge requires stopping of the press and repacking the blanket. For a no-pack blanket, such a loss in gauge requires replacement of the blanket with a new blanket.

The present invention provides several methods by which the gauge loss in reinforcing fabric plies in a printing blanket may be minimized, thus increasing the useful life of the blanket. In one embodiment of the invention, the yarn fibers in the fabric are rendered resistant to permanent deformation by impregnating the fiber bundles with an elastomeric compound. The elastomer invades and fills in the air spaces in the fiber bundles and fixes the relative positions of the fibers. Simply coating the fabric with an elastomer will be insufficient to achieve a fabric having resistance to permanent deformation as the air spaces in the fiber bundles will remain. The elastomer must penetrate at least partially, if not fully, into the air spaces within individual fibers bundles and fix the fibers against movement.

We have found that for embodiments of the invention where the blanket is not permanently reduced in gauge prior to use, the minimum amount of elastomer needed to provide on-press improvements in the resistance to permanent deformation is about 6 gm/m$^2$, for elastomers having a specific gravity in the range of from about 1.0 to 1.4. For the embodiment of the invention in which the blanket is permanently reduced in gauge by calendaring, we have found that the minimum amount of elastomer needed to provide on-press improvements in the resistance to permanent deformation is about 2 gm/m$^2$.

Appropriate adjustments to this minimum amount may be made for elastomers having specific gravities falling outside this range. The upper limit to the amount of elastomer is that amount which completely saturates and fills all air spaces within the fiber bundles. Again, based on an assumed specific gravity in the range of from about 1.0 to 1.4, the maximum amount of elastomer will be about 125 gm/m$^2$. When operating near this upper limit, consideration must be taken regarding the degree of stiffness of the fabric. Use of greater amounts of elastomer produce a fabric having greater stiffness. While it is desirable to render all of the fabric layers in the blanket construction resistant to permanent deformation, the advantages of the present invention may be partially realized by so treating a single fabric layer.

The elastomeric compound used to impregnate the fabric is selected from the group consisting of natural and synthetic rubbers such as acrylonitrile butadiene, carboxylated acrylonitrile butadiene, or neoprene, and latex rubbers. Preferred elastomers include carboxylated nitrile rubber and acrylonitrile butadiene rubber.

To accomplish impregnation of the woven fabric ply, the ply may be dipped into a solution of either a liquid rubber compound or an aqueous-based latex rubber, the solution forced or otherwise squeezed into the individual fabric threads, and the excess solution removed. The liquid rubber dipping solution may be formed by dissolving a solid elastomer into a solvent such as toluene or methylethyl ketone. For example, from about 10–20% by weight elastomer may be dissolved into a solvent. An example of a liquid rubber in solvent suitable for use in the present invention is from about 12–15% by weight acrylonitrile butadiene rubber in toluene. Alternatively, the elastomer compound may be a water-based latex into which the woven fabric ply may be dipped. The dipping solution has a relatively low viscosity in the range of from about 2,000 to 20,000 centipoise. This low viscosity enables the liquid rubber or latex solution to penetrate into individual fiber bundles in the fabric weave. The dipping apparatus may be any suitable container into which the dipping solution is contained. The fabric ply may be passed through the dipping apparatus using conventional powered let-off and wind-up rolls.

In either instance, it is preferred that the woven fabric ply be maintained under tension during the dipping process. Preferably tension of from about 2.8 to about 16.8 kg/cm of fabric width is maintained. This can be readily accomplished by the use of brake tension let-off and power wind up of the fabric ply. The fabric ply is then dried to evaporate solvent or water, as the case may be, and solidify the impregnated elastomer.

In another embodiment of the invention, the printing blanket of the present invention may be made to resist permanent deformation by calendaring the woven fabric ply with heated rolls to permanently reduce its thickness after impregnation with liquid elastomer but prior to its assembly in the blanket. In this manner, the fiber bundles are permanently compacted before the blanket is constructed and fixed into position by the elastomer. Previously, pre-calendared fabric plies in blankets swelled and regained thickness when the blankets were exposed to common liquids and solvents encountered during press operation. This caused an increase in gauge in the fabric ply or plies back to their precalendared thickness. By using the process of the present invention, the fabric is permanently compacted and is impervious to liquids and other solvents which are encountered during press operations.

A preferred method for reducing the initial gauge of the woven fabric ply is after dipping, as described above using from about 2 to about 7 gm/m$^2$ of liquid elastomer, to pass it between rotating rolls which have been heated to a temperature of greater than the boiling point of water but less than that which would scorch the fabric and which have been adjusted to apply pressure to the fabric. Preferably, the gauge of the ply is reduced to about 75% of its initial thickness by the calendaring step and may be reduced even further to about 65% of its initial thickness.

Alternatively, the step of impregnating the woven fabric ply may include heating the elastomeric compound until it is pliable and then forcing the heated elastomeric compound under pressure into the outer fibers in the individual fiber bundles in the fabric and into the interstices between warp and weft yarns of the woven fabric ply. This may be accomplished by spreading the pliable elastomer onto one of two rotating rolls and passing the fabric between the rolls. By operating the rolls at different speeds, the resulting friction scrubs the pliable elastomer into the weave of the ply and at least partially into the surface of the individual fiber bundles.

Thus, in a preferred method of operation, the fabric is passed between two rotating rolls with one roll being driven at a speed which controls the surface speed of the fabric and the other roll being coated with the pliable elastomer and being driven at a somewhat higher speed to create the frictional scrubbing action to force the elastomer into the surface of the fabric weave and into the interstices between the warp and weft yarns. Again, merely surface coating the fabric with elastomer will be insufficient to achieve a fabric having resistance to permanent deformation. Optionally, the fabric may be passed through the rolls a second time to expose the other side of the fabric to the elastomer.

The elastomer acts to fix the individual fibers in place and prevent movement. Additionally, because the elastomer is forced into only the interstices between yarns and into the outer fibers of individual bundles, the fabric remains relatively more flexible than with total impregnation. The inner fibers in the bundles may remain free to move, flex, and bend as needed to mount the blanket on a cylinder.

In still another embodiment of the invention, the means for resisting permanent deformation comprises the placement of the fibers in the various yarns such that movement of the fibers from the cyclic compressible pressure of the printing process is minimized and/or restricted by the fibers themselves. This may be accomplished by using a weave for the woven fabric ply which minimizes air gaps between fibers and produces a dense weave. In this manner, less air space is present in the individual fiber bundles, and there is less opportunity for movement and permanent deformation of the fibers bundles.

Typically, yarn threads which have been used in the past for blanket fabrics have comprised two small diameter threads twisted together with approximately 8 to 20 turns (twists) per inch. Such yarns have been termed "two-ply yarns". Thus, from 8 to 20 times per lineal inch of yarn, the smaller diameter yarns cross over each other when viewed from a plane perpendicular to the woven fabric surface. Between these multiple crossovers, the fibers of the yarn are lying side by side, producing a differential in the resistance to pressure squeezing along the yarn length.

These typical fabrics contain from 40 to 100 yarn threads per inch of fabric woven in the standard over one, under one configuration or alternatively in the square woven over one, under one configuration in both the warp and weft directions, where the yarns cross over each other. Because these crossovers sometimes fall at different points along the twisted yarns (i.e., where the yarn ply twists are sometimes side-by-side, sometimes one on top of the other and sometimes skewed), the squeezing pressure from the printing process has a different effect on the movement of the yarns. Eventually, a permanent movement of the yarns is produced, resulting in a permanent gauge loss in the blanket.

To prevent or reduce this yarn fiber shifting, the weave of the fabric may be designed to provide more equalized fiber densities throughout the fabric. This may be accomplished by: 1) using single (round) yarns of the desired diameter in place of twisted two-ply yarns having the same effective diameter; 2) using three or more smaller diameter yarns, and preferably from four to six, twisted (plied) to yield the desired effective diameter; or 3) helically wrapping a small yarn around a small, high strength core yarn with the wrapping yarn (sheath) being wrapped closely together (touching) at approximately 90° to the core yarn. In this embodiment, the sheath yarn holds the core fibers in a nearly nondeformable round position. The core yarn may be any high tenacity fiber including both natural and synthetic fibers, fiberglass, or even metal wire. As the sheath yarn, any fibers which are compatible (i.e., adhere to) with the elastomeric adhesives used to bond layers together may be used. The sheath yarns may be used as both the warp and weft yarns of the fabric weave, but are also quite effective in resisting permanent deformation when used as the warp yarns alone in a fabric weave.

Additionally, any of the above-discussed yarns may be woven together in patterns where the weft yarns go over two or more and under two or more warp yarns as a group, with one or more weft yarns going over and under the same threads as their adjacent weft yarn, and with the next weft yarn or group of weft yarns being opposite (under-over the warp yarns). Thus, an Oxford weave of one weft yarn alternating over and under two warp yarns or a basket weave of equal numbers of two or more weft and warp yarns in each direction may be used.

In order that the invention may be more readily understood, reference is made to the following examples, which are intended to be illustrative of the invention, but are not intended to be limiting in scope.

EXAMPLE 1

Elastomer impregnated printing blankets were manufactured by dipping a typical square-woven fabric two-ply yarn twisted at 8–20 turns per inch into a liquid solution of from 12–15% by weight acrylonitrile butadiene rubber in a solvent and then drying the fabric. A total of 14–28 gm/m$^2$ of elastomer was impregnated into the fabric. The impregnated fabric was then used to form the reinforcing layers of four ply printing blankets. The blankets were manufactured to have an original gauge of 2.08 mm (0.082 inches). The blankets were then installed on two newspaper presses and operated for two months. During that time, the gauge of the blankets was periodically measured on both the drive and operator sides of the presses. After two months and almost five million impressions, the measured gauge of the blankets was 1.98 mm (0.078 inches), which represents slightly more than 95% of the original gauge.

EXAMPLE 2

Printing blankets were manufactured by heating an acrylonitrile butadiene elastomer until it was pliable and the coating it onto the first of a pair of rolls operating at different speeds. Woven fabric, as in Example 1, was passed between the rolls, and the pliable elastomer was scrubbed into the interstices of the fabric weave. The fabric was then cooled to set the elastomer. The treated fabric was then used to form the reinforcing layers of four ply printing blankets. The blankets were manufactured to have an original gauge of 2.08 mm (0.082 inches). The blankets were then installed on two newspaper presses and operated for two months. During that time, the gauge of the blankets was periodically measured on both the drive and operator sides of the presses. After two months and almost five million impressions, the measured gauge of the blankets was 1.98 mm (0.078 inches), which represents slightly more than 95% of the original gauge.

EXAMPLE 3

Elastomer impregnated printing blankets were manufactured by dipping woven fabric, as in Example 1, into a liquid solution of 15% by weight acrylonitrile butadiene rubber in toluene and then drying the fabric. A total of 14–28 gm/m$^2$ of elastomer was impregnated into the fabric. The impregnated fabric was then calendared between heated rolls to reduce the thickness of the plies, and the plies used to form the reinforcing layers of four ply printing blankets. The blankets were manufactured to have an original gauge of 1.95 mm. Commercial printing blankets manufactured by Day International Corporation under the designation 9500 were used for comparison purposes. The blankets were the same in all respects except for the use of elastomer impregnated fabric and heat calendared and elastomer impregnated fabric in the test blankets.

A number of both types of blankets were then installed on newspaper presses and operated. During that time, the gauge of the blankets was periodically measured on both the drive and operator sides of the presses, as well as with 100 mm of the cylinder gap and on the opposite side of the blanket cylinder. After 500,000 and two million impressions, the average measured gauge of the untreated blankets was 1.86 mm and 1.80 mm, respectively, representing a final thickness which was about 92% of original gauge and a final thickness which was 0.15 mm less than original. By comparison, the treated blankets after 500,000 and two million impressions, measured an average gauge of 1.91 mm and 1.88 mm, respectively, representing a final thickness which was about 96% of original gauge and a final thickness which was 0.07 mm less than original.

Thus, the gauge loss of the elastomer treated blankets was less than one-half the gauge loss of the conventional blankets. In actual printing operations, this represented the difference between a spent blanket and one which could continue to be used by the press operator.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A printing blanket having improved gauge stability, said blanket including a printing surface layer and more than one reinforcing woven fabric ply, each of said fabric plies being impregnated with from about 6 to about 125 gm/m$^2$ of an elastomeric compound prior to assembly into said printing blanket, said elastomeric compound at least partially penetrating into air spaces of individual fiber bundles in said woven fabric plies and fixing said fibers against relative movement, said blanket resisting permanent deformation when subjected to printing nip pressures, said blanket retaining at least 95% of its original gauge throughout the useful life of said printing blanket.

2. The printing blanket of claim 1 wherein said elastomeric compound is selected from the group consisting of natural and synthetic rubbers and latexes.

3. The printing blanket of claim 1 wherein each of said woven fabric plies is impregnated with from about 10 to about 25 gm/m$^2$ of an elastomeric compound.

4. In a process of making a printing blanket including a woven fabric base ply and a rubber printing face ply disposed thereon, and including the steps of applying one or more rubber or fabric layers to said base ply to form said printing blanket, and curing said printing blanket, said printing blanket having improved gauge stability, the improvement comprising the step of fabricating said woven fabric ply by impregnating from about 6 to about 125 gm/m$^2$ of an elastomeric compound into said woven fabric ply such that said elastomer at least partially penetrates into the air spaces of individual fiber bundles in said woven fabric ply and fixes said fibers against relative movement prior to assembly of said woven fabric ply into said printing blanket, so that said printing blanket is resistant to permanent deformation when subject to printing nip pressures, said blanket retaining at least 95% of its original gauge throughout the useful life of said printing blanket.

5. In a process of making a printing blanket including a woven fabric base ply and a rubber printing face ply disposed thereon, said printing blanket having improved gauge stability, the improvement comprising the step of fabricating said woven fabric ply by impregnating from about 6 to about 125 gm/m$^2$ of an elastomeric compound into said woven fabric ply such that said elastomer at least partially penetrates into the air spaces of individual fiber bundles in said woven fabric ply and fixes said fibers against relative movement so that said printing blanket is resistant to permanent deformation when subject to printing nip pressures, said blanket retaining at least 95% of its original gauge throughout the useful life of said printing blanket, and wherein said impregnating step includes the steps of dissolving said elastomeric compound in a compatible solvent to form a liquid rubber, dipping said woven fabric ply into said liquid rubber, and removing said solvent to solidify said rubber.

6. The process of claim 5 in which said woven fabric ply is maintained under tension during the dipping step.

7. The process of claim 6 wherein said woven fabric ply is maintained under a tension of from about 2.8 to about 16.8 kg/cm of width of said fabric.

8. The process of claim 5 in which said woven fabric ply is squeezed after said dipping step to remove excess liquid rubber.

9. The process of claim 5 in which said elastomeric compound is selected from the group consisting of natural and synthetic rubbers including nitrile rubber.

10. In a process of making a printing blanket including a woven fabric base ply and a rubber printing face ply disposed thereon, said printing blanket having improved gauge stability, the improvement comprising the step of fabricating said woven fabric ply by impregnating from about 6 to about 125 gm/m$^2$ of an elastomeric compound into said woven fabric ply such that said elastomer at least partially penetrates into the air spaces of individual fiber bundles in said woven fabric ply and fixes said fibers against relative movement so that said printing blanket is resistant to permanent deformation when subject to printing nip pressures, said blanket retaining at least 95% of its original gauge throughout the useful life of said printing blanket, and wherein said impregnating step includes the steps of providing an aqueous based liquid latex, dipping said woven fabric ply into said liquid latex, and evaporating the water from said latex to solidify said latex.

11. The process of claim 4 in which said impregnating step includes heating said elastomeric compound and forcing said heated elastomeric compound under pressure into the interstices in said woven fabric ply.

* * * * *